Dec. 4, 1934. E. M. BERGSTROM ET AL 1,982,852
PIPE
Filed Sept. 26, 1931
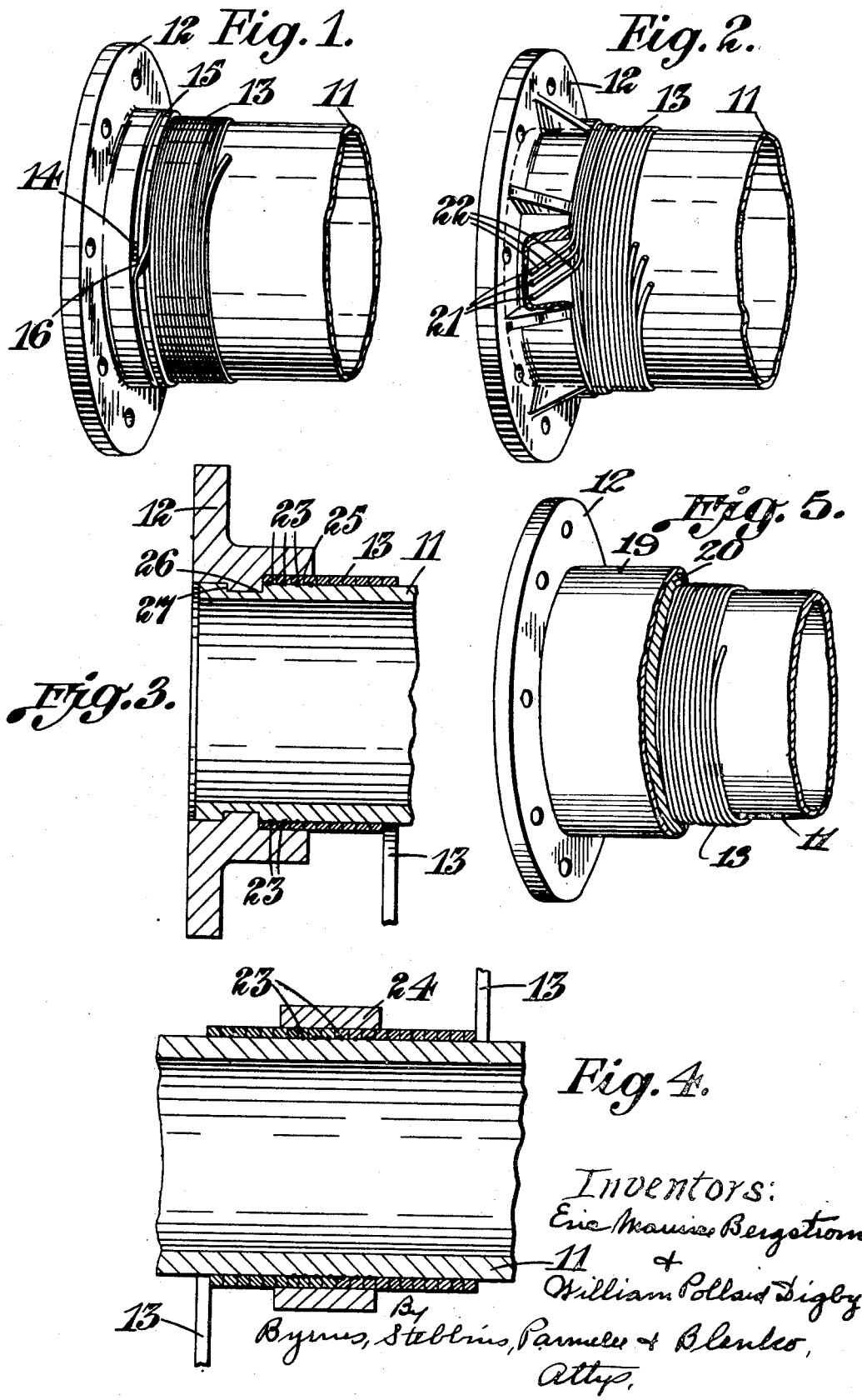

Patented Dec. 4, 1934

1,982,852

UNITED STATES PATENT OFFICE 1,982,852

PIPE

Eric Maurice Bergstrom, Goring-on-Thames, and William Pollard Digby, London, England Application September 26, 1931, Serial No. 565,370
In Great Britain September 29, 1930

5 Claims. (Cl. 137—75)

This invention consists of improvements in or relating to pipes and has particular reference to pipes of the general type in which one or more layers of wire under tension are wound spirally around a pipe or conduit which is to be used to convey fluid under pressure. According to the present invention the tension at which the wire is to be wound upon the conduit is determined by the materials of which the wire and the conduit are constructed and the number of layers of wire to be wound on and these factors are so proportioned that the inner shell and the wire windings fail under internal pressure approximately simultaneously.

This invention therefore includes a reinforced conduit comprising an inner tube of metal wound around with one or more layers of high tensile wire under such a tension that there is only slight compression on the inner tube when empty and in which at the failure point the stress is substantially equally shared between the materials subjected to stress, and the invention further includes processes for the manufacture of such reinforced conduits.

The inner tube may be flanged and a wire wound around it and secured to the flanges and/or the body of the tube. The wire may be secured for example by clamping, brazing, welding or electro-deposition or by the employment of a combination of these methods. The welding may be conveniently carried out by the electric resistance method. The inner tube may have collars secured to it (for example by riveting or welding) the wire being wound around the tube between the collars. Preferably each length of wire between adjacent collars is in a single unjointed length. The wire may be attached to the inner tube by welding (for example by spot welding) and the collar or flange may be shrunk on to the inner tube over the end turn or turns of the wire.

A tube (for example of metal or woven material) may be placed over the wire windings and the space between the windings and the tube filled with an inert substance, for example a bituminous filler.

The invention further includes a process for the manufacture of reinforced conduits wherein the inner tube is heated to 300–400° C. and treated with white lead paint and thereafter is wound with wire, paint being applied during the winding, and finally heating the conduit to 300–400° C. and treating it with white lead paint.

It will be understood that the present invention is not limited to the application of a single layer of wire winding to a metal conduit, or of wire of any particular cross-section or material, and it is within the scope of this invention to employ any number of layers or windings applied simultaneously or consecutively. It will further be understood that it is within the scope of this invention to utilize in the process for winding a wire upon the inner tube any suitable means for indicating the tension of the windings.

The following are descriptions by way of example and with reference to the accompanying drawing of forms of reinforced conduits constructed according to the present invention. Like parts are denoted by like reference numerals throughout the drawing.

Figure 1 shows a portion of a wire-wound pipe in which an inner metal shell 11 has secured to it a flange 12. High tensile wire 13 is secured for example by clamping means 14 in a groove 15 in the flange 12 and passes via the inclined groove 16 from the flange to the outer surface of the pipe.

Figure 2 represents a portion of a reinforced pipe (with part of the flange broken away) and shows a construction in which three wires are wound side by side on the inner metal shell 11, holes 21 being drilled in the shell near the end of the pipe before the flange 12 is fitted. The ends of the wires 22 (previously annealed) are secured by welding in the holes 21. The flange 12 is then pressed into place over the ends of the wires and the windings applied under tension. The other ends of the wires may be similarly secured and the ends of the wires may be trimmed off flush with the inner face of the pipe.

Figure 3 shows a longitudinal section of a portion of a pipe in which the flange 12 is shrunk on to the pipe body 11 over the end turns of wire 13 which have been previously secured to the pipe 11 by spot welds 23. The inner surface of the flange is recessed at 25 to accommodate the end turns of the wire 13 and is provided with a tongue 26 which engages a corresponding groove 27 in the outer surface of the pipe.

Figure 4 is a longitudinal section of a portion of pipe in which an intermediate collar 24 is shrunk on to the pipe 11 and embraces the end turns of the wire 13 wound on either side of it, the ends of the wires being secured to the pipe by spot welds 23.

Figure 5 shows a modified construction in which the pipe 11 has a flange 12 and a wire winding 13 similar to the winding of Figure 3 but over the wire winding there is a tube 19 spaced somewhat from the winding and the space between the winding and the tube is filled with a bituminous filler 20.

A convenient method of manufacturing a reinforced conduit embodying the methods of fixing the wire shown in Figures 3 and 4 will now be described.

*Example*

A mild steel welded tube 11 has a groove 27 cut in its outer surface to take a corresponding tongue 26 on the inner surface of a flange 12 which is also recessed at 25 by an amount sufficient to accommodate the end turns of wire 13 and to hold them securely against the inner tube. The ends of three wires of high tensile steel (only one of which is shown in the drawing) each of sufficient length to form a complete winding between the flanged end of the pipe and the first collar 24 is secured to the pipe by spot welds 23, and the pipe mounted in a lathe. By calculation from the physical properties of the inner tube and wire the tension at which the wire must be wound in order that at the point of failure the stress will be substantially equally shared between the inner tube and the reinforcing means is determined and the wire wound on at this tension. A suitable device for indicating the tension of the wires is attached to the winding gear.

When the point at which the first collar is to be attached is reached, the ends of the wires 13 are secured by spot welds 23 to the pipe, the ends of the fresh lengths of wire which are to be wound between the first collar and the second attached to the tube and wound on in a similar way. Finally the collars 24 are shrunk on over the spot welds at the ends of the wires intermediate between the ends of the tube and the flanges 12 are shrunk on at the ends of the tube.

In making the actual calculation of the thickness of the pipe and of the wire we start with the conventional assumption that the pipe is to be tested and treated as a closed cylindrical shell and that the circumferential stress is double the axial stress. If the thickness of the shell is calculated to take the circumferential stress the conventional formula would be $$t = \frac{pd}{2T}$$

On the other hand if the radial thickness of the cylindrical shell is calculated so as to take only the horizontal stress the conventional formula is $$t = \frac{pd}{4T}$$

where $t$ = radial thickness of wall of cylindrical shell in inches.
$p$ = internal pressure in pounds per square inch.
$d$ = internal diameter in inches.
$T$ = working stress in steel in lbs. per square inch at the elastic limit.

The starting point for our calculation is to balance the circumferential and axial stresses in the shell so that these are substantially equal at the elastic limit (i. e. at the point at which yielding commences). In other words we use a shell which is half the thickness of the shell calculated to take the circumferential stress without reinforcement. Thus in a specific case of a pipe of 22 inches internal diameter for a working pressure of 1,500 lbs. per square inch, with a factor of safety at the elastic limit of 2 to 1, the calculated thickness of the shell without reinforcement would be 1.18 inches, but according to this invention the thickness of the inner shell (calculated to take only the axial stress) is 0.59 inches.

The wire is wound on to the cold empty shell under a slight tension. By the expression "slight tension" we mean such a tension that the wire fits closely round the inner tube without exerting other than a negligible compressive stress upon the inner tube when the pipe is empty. This tension is a mere fraction (say 1% or less) of the tension in the wire at its elastic limit.

The thickness of the reinforcing wire is calculated on the assumption that the wire forms a cylindrical shell which at the elastic limit or where yielding commences will take half the circumferential stress. The elementary formula for calculating the radial thickness $t_W$ of the reinforcing wire, $T_w$ being the elastic limit of the wire, i. e.

$$70 \times 2240 \times 0.5 \text{ is } t_w = \frac{pd}{4T_w}$$

In the particular case dealt with above the thickness of the reinforcing wire is 0.118 inch, and the tension in the wire when wound on the cold empty pipe is about 20 lbs.

We claim:

1. A conduit adapted to withstand internal pressure setting up circumferential and axial stresses therein comprising in combination a metallic tube of strength sufficient to sustain the axial stress, a wire armour wound helically on the tube providing strength in a circumferential direction in addition to that of the tube and substantially equal to that of the tube, flanges shrunk over the end turns of the wire adjacent the ends of the tube and collars shrunk over the ends of the wire intermediate the ends of the tube.

2. A conduit adapted to withstand internal pressure setting up circumferential and axial stresses therein comprising in combination a metallic tube of strength sufficient to sustain the axial stress, a wire armour wound helically on the tube providing strength in addition to that of the tube and substantially equal to that of the tube in a circumferential direction, an inert substance covering the armour and an outer tube enclosing the inert substance.

3. A conduit adapted to withstand internal pressure setting up circumferential and axial stresses therein comprising in combination a metallic tube of a strength sufficient to sustain the axial stress, a wire armour wound helically on the tube providing strength in addition to that of the tube and substantially equal to that of the tube in a circumferential direction and flanges shrunk over the ends of the tube and over the end turns of the wire adjacent thereto so as to bind the wire to the tube.

4. A conduit adapted to withstand internal pressure setting up circumferential and axial stresses therein comprising in combination a metallic tube of a strength sufficient to sustain the axial stress, a wire armour wound helically on the tube providing strength in addition to that of the tube and substantially equal to that of the tube in a circumferential direction and collars shrunk over the end turns of the wire armour to bind said turns to the tube.

5. A conduit adapted to withstand internal pressure setting up circumferential and axial stresses therein comprising in combination a metallic tube of a strength sufficient to sustain the axial stress, a wire armour wound helically on the tube providing strength in addition to that of the tube and substantially equal to that of the tube in a circumferential direction and collars shrunk over the end turns of the wire armour and over the wire armour at intermediate positions to bind said wire armour to the tube.

ERIC MAURICE BERGSTROM.
WILLIAM POLLARD DIGBY.